(12) United States Patent
Imai

(10) Patent No.: US 9,069,491 B2
(45) Date of Patent: Jun. 30, 2015

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yasuhiro Imai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/175,578

(22) Filed: Feb. 7, 2014

(65) Prior Publication Data

US 2014/0240727 A1  Aug. 28, 2014

(30) Foreign Application Priority Data

Feb. 22, 2013  (JP) ................................ 2013-033333

(51) Int. Cl.
| | | |
|---|---|---|
| G06K 15/02 | (2006.01) | |
| G03F 3/10 | (2006.01) | |
| G06F 3/12 | (2006.01) | |
| G06K 15/00 | (2006.01) | |
| H04N 1/00 | (2006.01) | |

(52) U.S. Cl.
CPC ............... *G06F 3/12* (2013.01); *G06K 15/002* (2013.01); *G06K 15/40* (2013.01); *H04N 1/00* (2013.01); *G06K 15/407* (2013.01)

(58) Field of Classification Search
CPC .............. G06Q 30/02; G06Q 30/0269; G06Q 30/0277; G06Q 30/0201; G06Q 30/0204; G06F 3/12; G06K 15/002; G06K 15/40; G06K 15/407; H04N 1/00; H04N 1/40068; H04N 1/58; H04N 1/642
USPC ......... 358/1.9, 1.14, 1.15, 527; 399/79, 9, 10, 399/11, 24, 25, 26
See application file for complete search history.

(56) References Cited

U.S. PATENT DOCUMENTS

2011/0135337 A1* 6/2011 Saito et al. ...................... 399/79

FOREIGN PATENT DOCUMENTS

JP  2002-091743 A  3/2002

\* cited by examiner

*Primary Examiner* — Charlotte M Baker
(74) *Attorney, Agent, or Firm* — Cowan, Liebowitz & Latman, P.C.

(57) ABSTRACT

In the case where charging by grade in accordance with a plurality of image attributes is performed, it is not possible for a user to identify the image attribute with which printing is performed from the appearance of printed matter that is output. In accordance with a color pixel ratio in image data, an image attribute of the image data is determined and a display unit is controlled to display the determined image attribute and the color pixel ratio.

13 Claims, 18 Drawing Sheets

<Job history detailed information>

Reception No.: 0005
Result      : OK

- Start time            2012 09/14 7:18
- Completion time       2012 09/14 7:18
- Division ID           2
- User name             Taro
- Number of document pages    6
- Number of output pages      6
  By-image-attribute    Low 1 + Middle 3 + Full 2
  sheet number
- Number of sheets × number of copies    6 × 1

Detailed information (by page)

<Copy>
Printing is completed

- Number of output pages    6
- By-image-attribute sheet number
  Low area color(unit price 10 yen)    : 1
  Middle area color(unit price 20 yen) : 3
  Full area color(unit price 30 yen)   : 2
- Total amount of money  130 yen Detailed information  1301

Close

⟨Saved file⟩

| File format | File name | File size | Date of saving |
|---|---|---|---|
| pdf | file1 | 50.93KB | 2012/09/27 20:15 |
| jpeg | file2 | 80.4KB | 2012/09/27 8:00 |
| doc | file3 | 20.5KB | 2012/09/26 16:15 |
| pdf | file4 | 21.75KB | 2012/09/26 12:30 |
| pdf | file5 | 100.43KB | 2012/09/26 11:45 |

1400

1/2

Detailed information  
1402

Print  
1401

⟨Printing-time image attribute information⟩

- File name     file1
- Date of saving     2012/09/27 20:15
- Number of pages     6
- Color / Monochrome     Color

| Time | Reception No. | Settings | Number of copies | By-image-attribute sheet number |
|------|---------------|----------|------------------|----------------------------------|
| 8:19 | 4 | 2in1 One-side Auto | 1 | Low 2 + Middle 1+ Full 0 |
| 7:25 | 3 | Standard One-side Color | 1 | Low 2 + Middle 3+ Full 1 |
| 6:20 | 2 | 4in1 Both-side Monochrome | 1 | Low 2 + Middle 0+ Full 0 |

1/2

Detailed information

OK

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, an image processing method, and a storage medium.

2. Description of the Related Art

Conventionally, most apparatuses have the charging method for printing that includes only two kinds of charging, i.e. charging at the time of printing in two or more colors (color printing) and charging at the time of monochrome printing (image attributes in two degrees of color and monochrome).

There is a case where some documents to be printed mostly in monochrome and only a portion to be printed in color which includes, for example, stamps, logotypes, etc. In the case such as this, despite that most of the document is printed in monochrome, the fee for color printing is charged as in the case where most of the document is printed in color. The reason is that in the case where data to be printed in monochrome and data to be printed in color exist mixedly in one output sheet, the color printing operation is performed (that is, printing is performed four times for CMYK).

Consequently, there has been such a problem that the printing cost of a user is raised because even for a document in which the majority of the page to be printed is a monochrome area, the fee for color printing is charged in the case where a color area exists even slightly.

For this problem, the system that charges for printing in accordance with a ratio of color print area included in one output sheet is proposed (see Japanese Patent Laid-Open No. 2002-091743). In this system, drawing information of PDL data input via a network is analyzed to calculate a ratio of color area and charging is performed in accordance with the calculated ratio.

By the method of Japanese Patent Laid-Open No. 2002-091743, it is possible for a user to know the charging amount for a page to be printed, however, the image attribute and the color pixel ratio of each page used for charging calculation are not displayed on the operation unit of the apparatus, and therefore, it is not possible to know the image attribute and the color pixel ratio of each page.

SUMMARY OF THE INVENTION

The image processing apparatus of the present invention includes a determination unit configured to determine an image attribute of image data in accordance with a color pixel ratio in the image data and a display control unit configured to control a display unit to display the determined image attribute and the color pixel ratio.

According to the present invention, it is possible for a user to easily grasp with which image attribute and at which charging unit price each page of the printed matter to be output is printed.

Further features of the present invention will become apparent from the following description of exemplary embodiments (with reference to the attached drawings).

BRIEF DESCRIPTION OF THE DRAWINGS

FIG. 9 is a diagram showing an example of a Job history detailed information screen;

FIG. 13 is a diagram showing an example of a screen indicating that printing is completed (Printing completion screen);

FIG. 16 is a diagram showing an example of a Printing-time image attribute information screen;

DESCRIPTION OF THE EMBODIMENTS

Hereinafter, with reference to attached drawings, the present invention is explained in detail based on preferred embodiments thereof. Configurations shown in embodiments below are mere examples and the present invention is not limited to the configurations shown schematically.

<First Embodiment>

Figure 1:
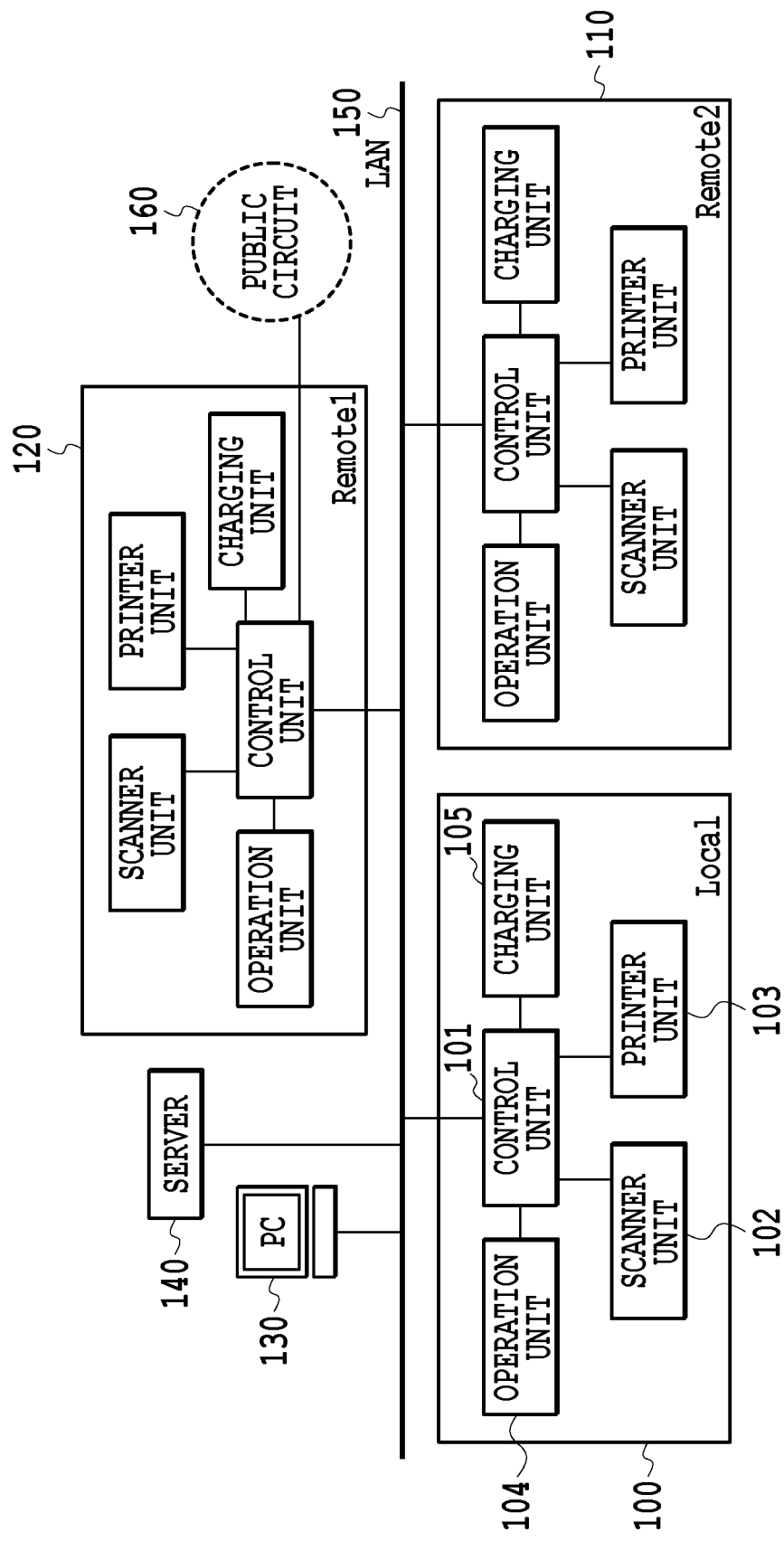
FIG. 1 is a diagram showing an example of a system configuration of an image forming system according to a first embodiment.

FIG. 1 is a diagram showing an example of s system configuration of an image forming system according to the present embodiment.

An image forming apparatus 100 capable of color printing includes a control unit 101, a scanner unit 102 configured to read a document, a printer unit 3 as a printer engine, an operation unit 104 as a user interface, and a charging unit 105 configured to perform charging processing. The scanner unit 102, the printer unit 103, the operation unit 104, and the charging unit 105 are each connected to the control unit 101 and the control unit 101 is connected to a network transfer unit, such as a LAN 150, and a public circuit 160. From the public circuit 160, it is possible to perform transmission by a G3 or G4 facsimile machine, including color image transmission. Further, to the LAN 150, other image forming apparatuses 110 and 120 having the same configuration as that of the image forming apparatus 100 are connected. Furthermore, a personal computer (PC) 130 is connected and it is possible to transmit and receive a file using the FTP or SMB protocol and to transmit and receive an electronic mail. The image forming apparatuses 100, 110, and 120 are connected to a server 140 and are capable of transmitting and receiving various kinds of data and storing data in the server 140.

The charging unit 105 performs charging processing in accordance with charging information, to be described later. Specifically, the charging unit 105 displays a charge for use calculated based on the charging information on the operation unit 104 to prompt a user to pay the charge for use and receives a predetermined amount of money (for example, coins or bills) through a slot, not shown schematically.

Figure 2:
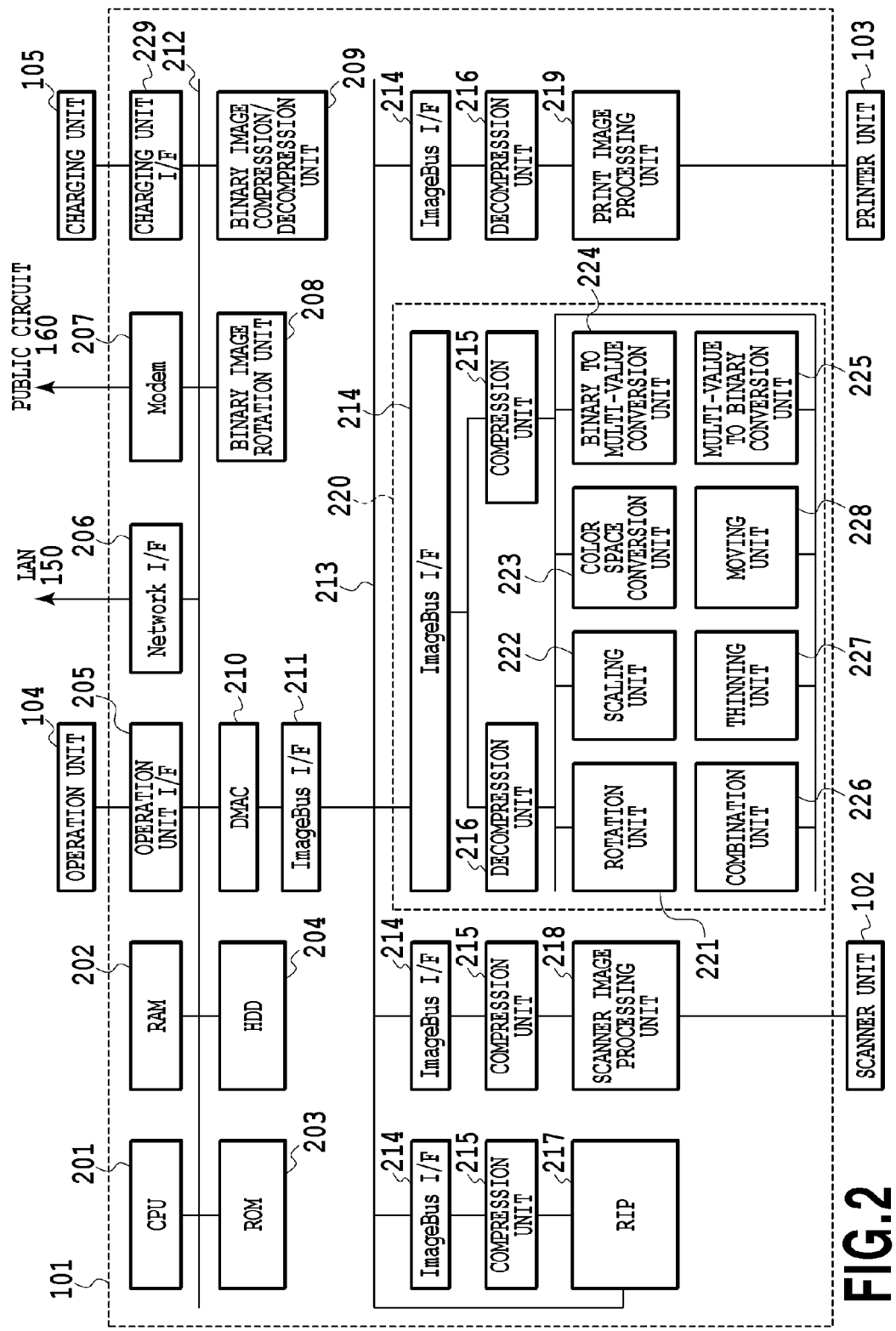
FIG. 2 is a block diagram for explaining an internal configuration of a control unit of an image forming apparatus.

FIG. 2 is a block diagram for explaining an internal configuration of the control unit 101 of the image forming apparatus.

The control unit 101 includes each unit below.

A CPU 201 reads control programs and performs various kinds of processing, and comprehensively controls each unit. The CPU 201 also generates charging information for charging in accordance with the contents of printing. The generated charging information is sent to the charging unit 105 through a charging unit I/F 229.

A RAM 202 is a system work memory for the CPU 201 to operate and is also an image memory for temporarily storing image data.

A ROM 203 is a boot ROM and stores boot programs of the system.

An HDD 204 is a hard disk drive and stores system software and image data.

An operation unit I/F 205 is an interface unit with the operation unit 104 and outputs image data to be displayed on the operation unit 104 to the operation unit 104. Further, the operation unit I/F 205 plays a role to transfer information input by a user via the operation unit 104 to the CPU 201.

A network I/F 206 connects to the LAN 150 and inputs and outputs various kinds of information.

A modem 207 connects to the public circuit 160 and inputs and outputs various kinds of information.

A binary image rotation unit 208 and a binary image compression/decompression unit 209 change the direction of an image before transmitting binary image data by the modem 207 and perform processing to convert the resolution into a predetermined resolution or into a resolution in accordance with the performance of the other party. Compression and decompression support JBIG, MMR, MR, and MH.

A DMAC 210 is a DMA controller and reads image data stored in the RAM 202 without interposition of the CPU 201 and transfers the data to an image bus I/F 211. Alternatively, the DMAC 210 writes image data from the image bus into the RAM 202 without interposition of the CPU 201. Each unit described above is connected to a system bus 212.

The image bus I/F 211 is an interface for controlling fast input and output of image data via an image bus 213.

A compression unit 215 performs processing to perform JPEG compression on image data in units of 32 pixels×32 pixels before sending out the data to the image bus 213.

A decompression unit 216 performs processing to decompress image data sent via the image bus 213.

A raster image processor (RIP) 217 receives a PDL code from a host computer via the network I/F 207 and the CPU 201 stores the code in the RAM 202 through the system bus 212. The CPU 201 converts the PDL code into an intermediate code and inputs the intermediate code to the RIP 217 via the system bus 212 again and the intermediate code is developed into a bit map image (multi-valued) in the RIP 217.

A scanner image processing unit 218 performs various kinds of image processing, such as correction, treatment, and edition, on the input image data (color image data or monochrome image data) read by the scanner unit 102 (multi-valued).

A print image processing unit 219 performs various kinds of image processing for printing processing on image data in the output stage (hereinafter, referred to as "output image data") in which printing settings etc. are reflected. At the time of printing, the decompression unit 216 carries out binary to multi-value conversion, and therefore, it is possible to produce a binary or multi-valued output. Further, the print image processing unit 219 determines whether output image data includes color pixels (hereinafter, referred to as "color pixel determination"). Details of the color pixel determination processing will be described later.

An image conversion unit 220 carries out various kinds of conversion on image data on the RAM 202 or at the time of returning image data to the RAM 202.

A rotation unit 221 performs processing to rotate an image in units of 32 pixels×32 pixels through a specified angle to prepare for binary and multi-valued input and output.

A scaling unit 222 performs processing to convert the resolution of an image (for example, from 600 dpi to 200 dpi) or to change the magnification (for example, from 25% to 400%). Before changing the magnification, the scaling unit 222 rearranges the image of 32 pixels×32 pixels into an image in units of 32 lines.

A color space conversion unit 223 converts a multi-valued input image by a matrix operation or LUT, for example, converts a YUV image on the memory into a Lab image and stores the Lab image on the memory. The color space conversion unit 223 performs a 3×8 matrix operation and has a one-dimensional LUT, and also performs the publicly-known background removal and processing to prevent show-through. The converted image data is output as multi-valued data.

A binary to multi-value conversion unit 224 converts a 1-bit binary image into an 8-bit multi-valued image with a 256-step gradation.

A multi-value to binary conversion unit 225 converts, for example, an 8-bit image with a 256-step gradation on the memory into a 1-bit image with a 2-step gradation by a method, such as error diffusion processing.

A combination unit 226 performs processing to combine two multi-valued images on the memory into one multi-valued image. For example, by combining an image of a company's logotype and a document image on the memory, it is possible to generate an output image in which the company's logotype is attached to the document image.

A thinning unit 227 carries out resolution conversion by thinning pixels of a multi-valued image. It is possible to output a multi-valued image of a resolution ½, ¼, or ⅛ of the original one. By using the thinning unit 227 together with the scaling unit 222, it is possible to perform enlargement and reduction in a wider range.

A moving unit 228 performs processing to add a marginal part to a binary image and a multi-valued image that are input or to remove a marginal part.

It is possible for the rotation unit 221, the scaling unit 222, the color space conversion unit 223, the binary to multi-value conversion unit 224, the multi-value to binary conversion unit 225, the combination unit 226, the thinning unit 227, and the moving unit 228 to operate in an interlocking manner with one another. For example, in the case where a multi-valued image on the memory is rotated and the resolution of which is converted, it is possible to perform both pieces of processing in an interlocking manner without interposition of the memory.

The above is the internal configuration of the control unit 101.

Figure 3:
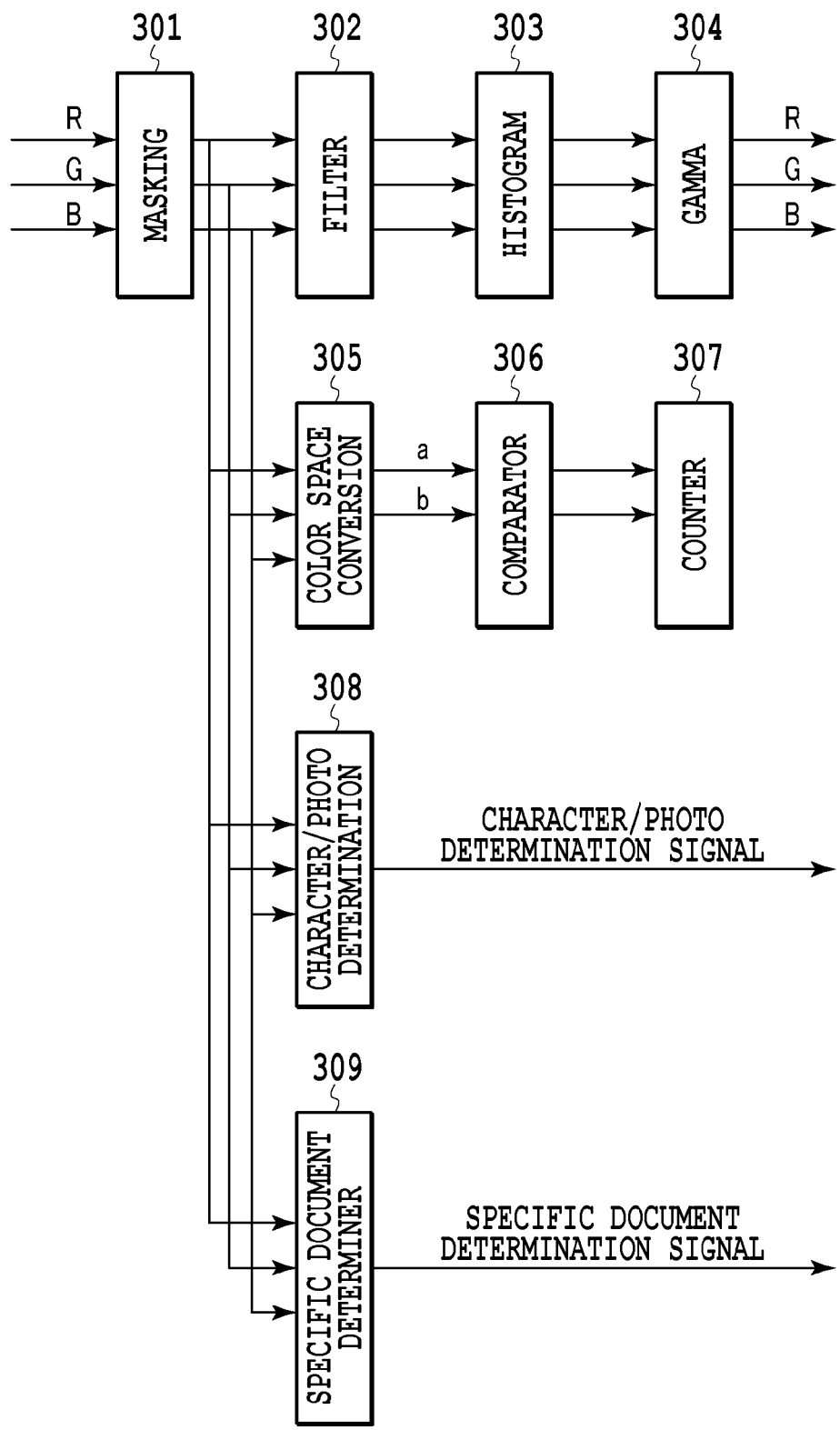
FIG. 3 is a diagram showing details of processing in a scanner image processing unit.

FIG. 3 is a diagram showing details of the processing in the scanner image processing unit 218.

Each 8-bit brightness signal of RGB input from the scanner unit 102 is first converted into a standard color signal of RGB that does not depend on the filter color of CCD by masking 301.

In a filter 302, for example, processing to blur an image or to make an image vivid is performed using a 9×9 matrix.

In a histogram 303, sampling of image signal data in an input image is performed. In this module, a histogram is created by performing sampling in a main scan direction and in a sub scan direction at a constant pitch on RGB data within a rectangular area surrounded by start points and end points specified in the main scan direction and in the sub scan direction, respectively. The created histogram is read at the time of specification of background removal or show-through prevention and from the histogram, the background of a document is estimated and the estimated background is stored and managed as a background removal level together with the image data in the memory or the HDD and is used in image processing at the time of printing or transmission.

In gamma correction 304, processing to increase or reduce the density of the whole of an image. For example, the color space of an input image is converted into an arbitrary color space, and processing to correct hue of the input data is performed. For example, in order to determine whether a read document is a color document or a monochrome document, the image signal before scaling is converted into the publicly-known Lab color space by color space conversion 305.

A comparator 306 performs processing to determine whether a color represented by an image signal is a chromatic color or an achromatic color by comparing color signal components of a and b of the image signal converted into the Lab color space with a threshold value and outputs a 1-bit determination signal.

A counter 307 measures a determination signal from the comparator 306.

In character/photo determination 308, processing to separate an input image into characters and photos by extracting character edges from the input image and outputs a character/photo determination signal. The character/photo determination signal is also stored together with the image data in the memory or HDD and is used at the time of printing.

A specific document determiner 309 compares an input image signal with a predetermined pattern prepared in advance to determine to which extent the image signal and the pattern agree and outputs a determination result indicating agreement or disagreement. In accordance with the determination result, treatment processing etc. is performed on the input image, thereby preventing forgery of bills or securities.

Figure 4:
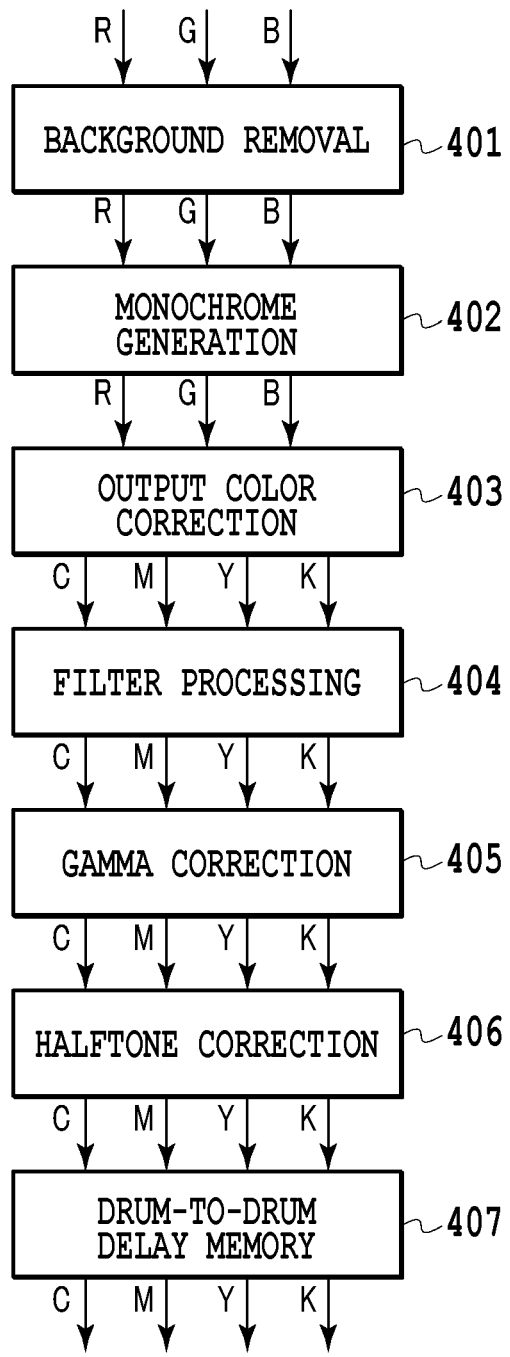
FIG. 4 is a diagram showing details of various kinds of image processing performed on output image data in a print image processing unit.

FIG. 4 is a diagram showing details of the various kinds of image processing performed on output image data in the print image processing unit 219. In the present embodiment, a case is explained as an example, where the output image data in the stage of being decompressed in the decompression unit 216 is RGB data.

In background removal 401, the ground color of the output image data (RGB data) is removed and unnecessary fog of the background is removed. For example, the background removal is performed by a 3×8 matrix operation or a one-dimensional LUT.

In monochrome creation 402, processing to convert color image data represented by RGB into Gray monochrome data is performed at the time of printing the data as a monochrome by converting the color image data into monochrome data. For example, a 1×3 matrix operation to multiply RGB by arbitrary constants to obtain a Gay signal is included.

In output color correction 403, color correction is made for color image data in accordance with the characteristics of the printer unit 103. For example, a 4×8 matrix operation and processing by direct mapping are included. In the output color correction 403, processing to convert RGB data into CMYK data is also performed.

In filter processing 404, processing to arbitrarily correct a spatial frequency of output image data is performed. For example, processing to perform a 9×9 matrix operation is included.

In gamma correction 405, processing to make gamma correction is performed on output image data in accordance with the characteristics of the printer unit 103. Normally, a one-dimensional LUT is included.

In halftone correction 406, arbitrary halftone processing is performed on output image data in accordance with the number of gradations of the printer unit 103, specifically, arbitrary screen processing, such as binarization and value multiplexing into a 32-valued image, and error diffusion processing are performed. It is also possible to switch pieces of processing by a character/photo determination signal, not shown schematically.

A drum-to-drum delay memory 407 is a memory used for accurately overlapping CMYK images by shifting the printing timings of CMYK by a period of time corresponding to the interval between each photoreceptor drum in a color printer including the photoreceptor drum of each color of CMYK. Due to this, output image data is subjected to delay processing in accordance with the drum arrangement and sequentially sent to the printer unit 103.

Figure 5:
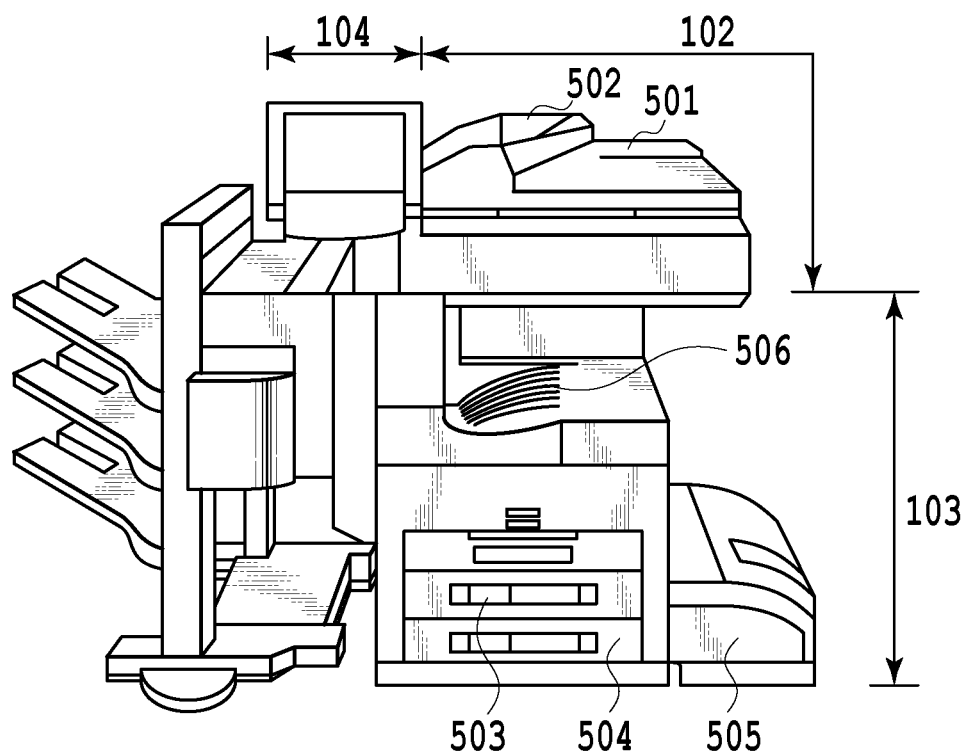
FIG. 5 is a diagram showing an external appearance of the image forming apparatus.

FIG. 5 is a diagram showing an external appearance of an image forming apparatus.

The scanner unit 102, which is an image input device, converts an image on a document into an electric signal as raster image data by illuminating the image and causing a CCD line sensor (not shown schematically) to scan. A document is set on a tray 502 of a document feeder 501 and the control unit 101 gives instructions to read the document to the scanner unit 102 in response to user's instructions via the operation unit 104 and the scanner unit 102 performs a read operation by feeding document sheets one by one from the tray 502.

The printer unit 103, which is an image output device, is a unit configured to form an image represented by raster image data on a sheet. In the present embodiment, explanation is given with an electrophotographic system as an example of such a system, however, the system is not limited to this and, for example, another system may be used, such as an inkjet system. The electrophotographic system is a system in which a latent image is formed on a photoreceptor drum by utilizing laser beams, the latent image is developed by a plurality of charged color materials (for example, toner of four colors of CMYK), and the developed image by toner is transferred to a transfer sheet and fixed, and thus the image is recorded. The inkjet system is a system in which a heating element or a piezoelectric element is used as a discharge energy generating element, a plurality of color materials (for example, ink of four colors of CMYK) is discharged from nozzles, and the ink is caused to stick to a recording medium, and thus, recording is performed. The printing operation starts by printing instructions from the control unit 101. The printer unit 103 has a plurality of paper feeding stages so that different sheet sizes or different sheet orientations can be selected and also has sheet cassettes 503, 504, and 505 corresponding thereto and a discharge tray 506 configured to receive printed sheets.

Next, color pixel determination processing in the present embodiment is explained.

In order to perform color pixel determination processing at a single part and to limit a color space to be input to one regardless of the kinds of jobs, it is necessary to perform color pixel determination processing with a timing at the time of the output color correction 403 in which RGB data is handled or earlier, or at the time of the filter processing 404 in which CMYK data is handled or later. It is desirable to perform color pixel determination processing on CMYK data corresponding to each color of CMYK of the photoreceptor drum rather than performing on RGB data because a color pixel determination result with high precision is obtained. That is, it is desirable to perform color pixel determination processing on image data configured by color components corresponding to a plurality of color materials used for forming an image. Even in the case where color pixel determination processing is performed on CMYK data, it is thought that a color pixel determination result with higher precision is obtained with timing nearer to the stage immediately before the data is sent to the printer unit 103. In the present embodiment, it is assumed that color pixel determination is performed immediately before the halftone correction 406 (i.e., on CMYK data having been subjected to gamma correction processing).

A procedure of color pixel determination in the present embodiment is as follows.

First, a data sequence of raster image data, which is output image data, is scanned and the number of pixels in which any one of colors of CMY has a gradation value equal to or more than a predetermined value (for example, equal to or more than 1) is counted. Then, a ratio of counted pixels to all pixels (color pixel ratio) of the raster image is calculated. Then, the calculated color pixel ratio is compared with a threshold value held in advance and the image attribute of the raster image is determined. Such processing is performed in unit of pages of the output image data. In the present embodiment, the image attribute is classified into three kinds, i.e., "Low area color", "Middle area color", and "Full area color" and to which image attribute an image belongs is determined using two threshold values. A first threshold value corresponds to a demarcation position between Low area color and Middle area color and a second threshold value corresponds to a demarcation position between Middle area color and Full area color, and it is possible to arbitrarily change the demarcation positions by changing the threshold values. For example, Low area color is the image attribute of a page whose color pixel ratio is 1% to 10%, Middle area color is the image attribute of a page whose color pixel ratio is 10% to 80%, and Full area color is the image attribute of a page whose color pixel ratio is 80% to 100%. The number of kinds of image attributes is not limited to three and it is needless to say that the number of threshold values corresponding to demarcation positions changes in accordance with the number of kinds of image attributes into which the image attribute is classified.

The image attribute thus determined is used for generating charging information as a charging unit price. For example, it is assumed that charging unit prices are set as "Low area color": 10 yen/page, "Middle area color": 20 yen/page, and "Full area color": 30 yen/page. In this case, an amount of money calculated by multiplying the charging unit price corresponding to the determined image attribute by the number of output pages is determined as a charging amount and the charging amount is sent to the charging unit 105 as charging information.

As described above, in the present embodiment, it is assumed that color pixel determination processing is performed in the print image processing unit 219, however, this is not limited. It may also be possible to provide an independent processing unit configured to perform color pixel determination processing using output image data separately from the print image processing unit.

Figure 6:
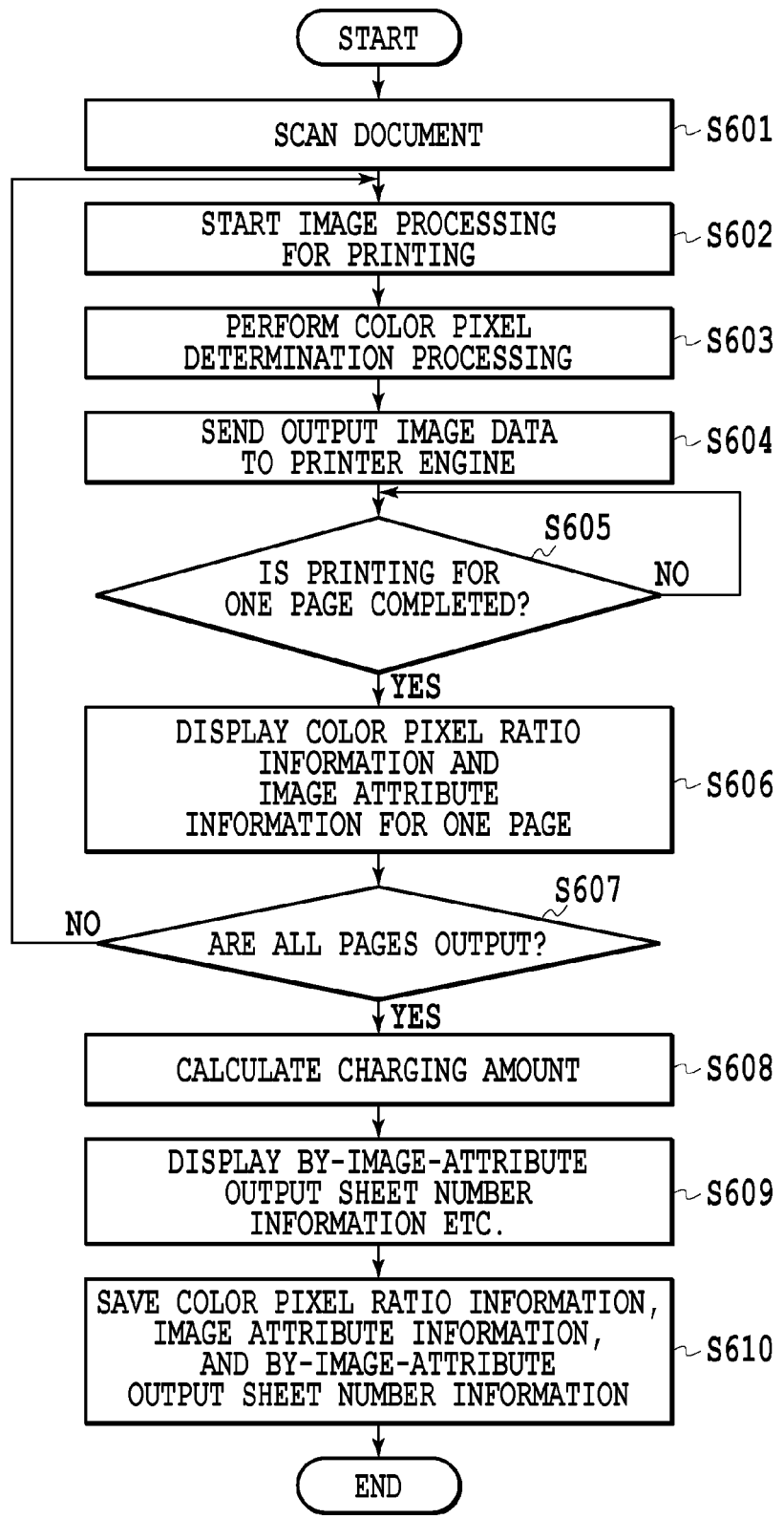
FIG. 6 is a flowchart showing a flow of processing in the case where copy processing is performed in the image forming apparatus.

FIG. 6 is a flowchart showing a flow of processing in the case where copy processing (processing to form an image on a recording medium, such as paper, in the printer unit 103 using image data read by the scanner unit 102) is performed in the image forming apparatus 100. The series of processing is performed by the CPU 201 executing a computer-executable program in which a procedure shown below is described after reading the program from the HDD 204 etc. onto the RAM 202.

In the case where a user performs predetermined printing settings (for example, 2in1, 4in1, one-side, both-side, etc.) and then gives instructions to execute copying via the operation unit 104, the CPU 201 instructs the scanner unit 102 to read a document at step 601. The image data read by the scanner unit 102 is stored in the HDD 204.

At step 602, the print image processing unit 219 reads output image data corresponding to one page from the HDD 204 and starts the image processing for printing described above.

At step 603, the print image processing unit 219 performs the above-described color pixel determination processing immediately before the halftone correction 406 on the read output image data corresponding to one page and determines an image attribute of the output image data corresponding to one page. Information of the determined image attribute is sent to the CPU 201.

At step 604, the CPU 201 sends the output image data corresponding to one page to the printer unit 103 (printer engine). The printer unit 103 performs printing processing using the received output image data.

At step 605, the CPU 201 determines whether printing of the one page is completed. In the case where printing of the one page is completed, the procedure proceeds to step 607.

At step 606, the CPU 201 sends information relating to the printing of the one page for which printing processing is completed, specifically, information of the color pixel ratio (color pixel ratio information) and information of the above-described image attribute (image attribute information) to the operation unit 104 via the operation unit I/F 205. Then, on a UI screen of the operation unit 104, the received information relating to the printing of the one page is displayed. Details of the display will be described later.

At step 607, the CPU 201 determines whether printing of all the pages of the output image data is completed. In the case where printing of all the pages is completed, the procedure proceeds to step 608. In the case where there is a page(s) not printed yet, the procedure returns to step 602.

At step 608, the CPU 201 calculates a charging amount for the output image data of all the pages based on the image attribute information for each page. For example, in the case where output image data includes five pages and the determined image attribute of all the pages is "Middle area color (charging unit price: 20 yen/page)", 5×20=100 (yen) is calculated. Information of the calculated charging amount is sent to the charging unit 105 via a charging unit I/F 229.

At step 609, the CPU 201 obtains the number of output sheets for each image attribute based on the image attribute information of all the pages. Then, the CPU 201 sends information of the obtained number of output sheets for each image attribute (by-image-attribute output sheet number information) and information of the total number of output pages and the charging amount for all the pages to the operation unit 104 via the operation unit I/F 205. Then, on the UI screen of the operation unit 104, these pieces of information are displayed.

At step 610, the CPU 201 transmits the color pixel ratio information, the image attribute information, and the by-image-attribute output sheet number information described above to the server 140, which is an external device, via the network I/F 206. The server 140 stores these pieces of information received. The server 140 holds the above-mentioned three pieces of information in a job history information management table for managing a history at the time of job execution. It is possible for a user to check the history of a job on the UI screen of the operation unit 104 by accessing the server 140, which is an external device, to acquire the job history information management table. The place where the job history information management table such as this is stored may be within the image forming apparatus (for example, the HDD 204).

Here, with reference to FIG. 7 to FIG. 11, the UI screen displayed in the operation unit 104 in the case where a user checks etc. job history information is explained.

Figure 7:
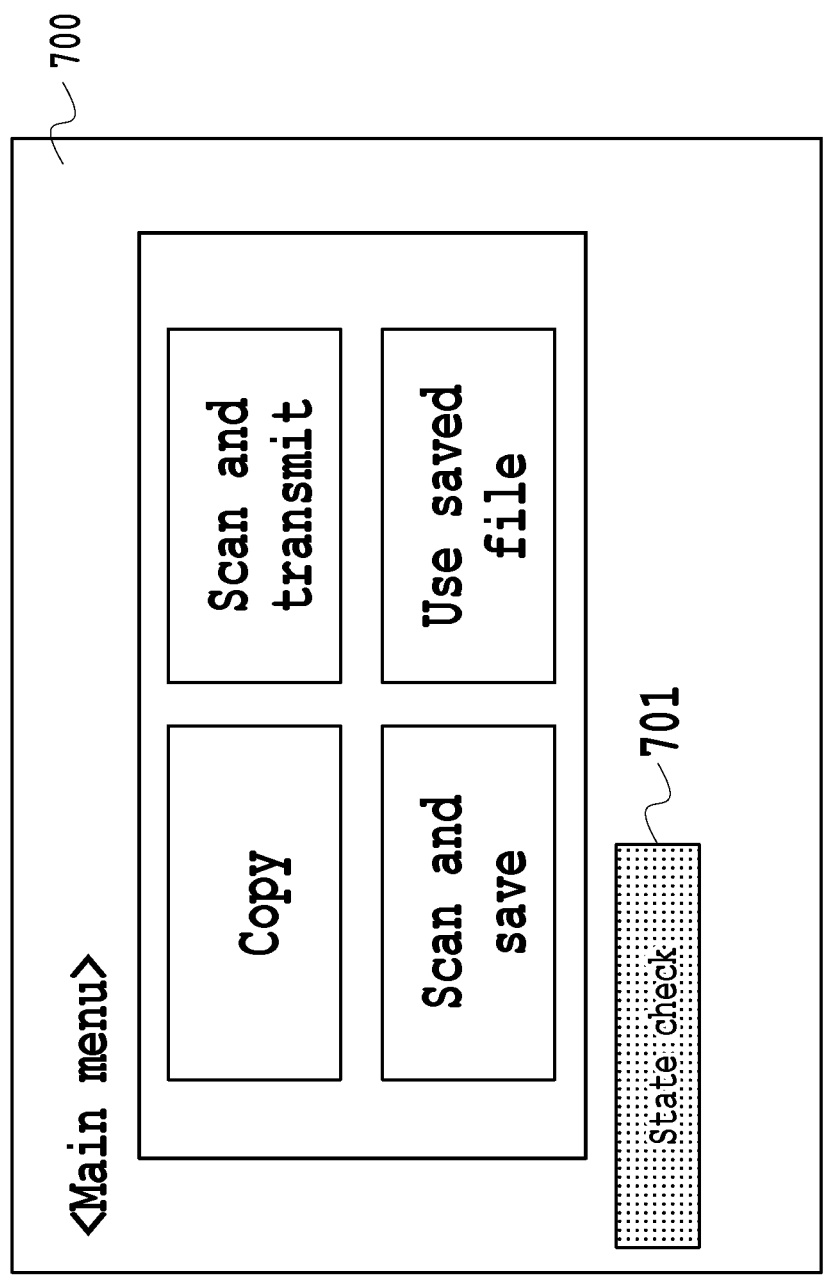
FIG. 7 is a diagram showing an example of a Main menu screen displayed at the time of activation of the image forming apparatus.
Figure 8:
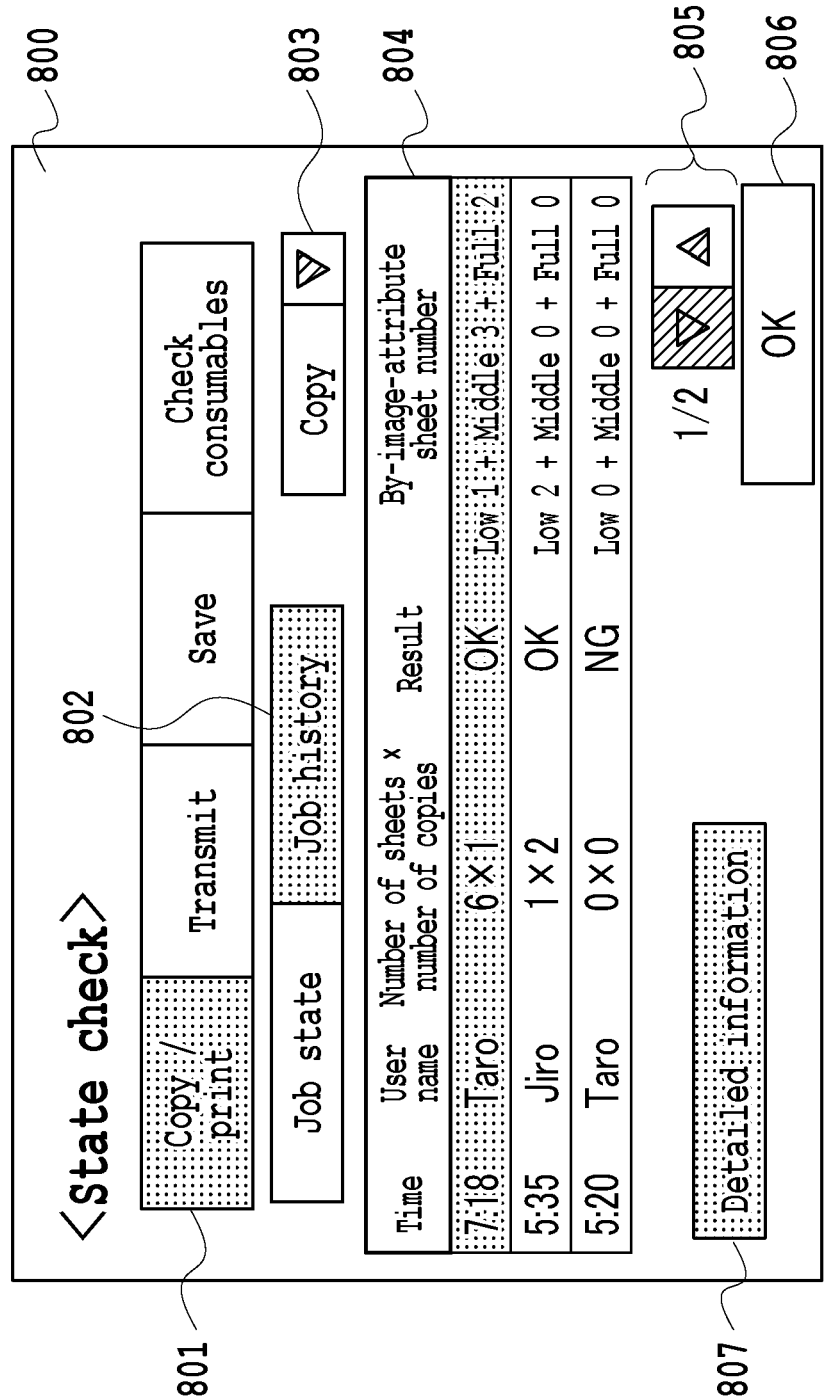
FIG. 8 is a diagram showing an example of a State check screen.
Figure 10:
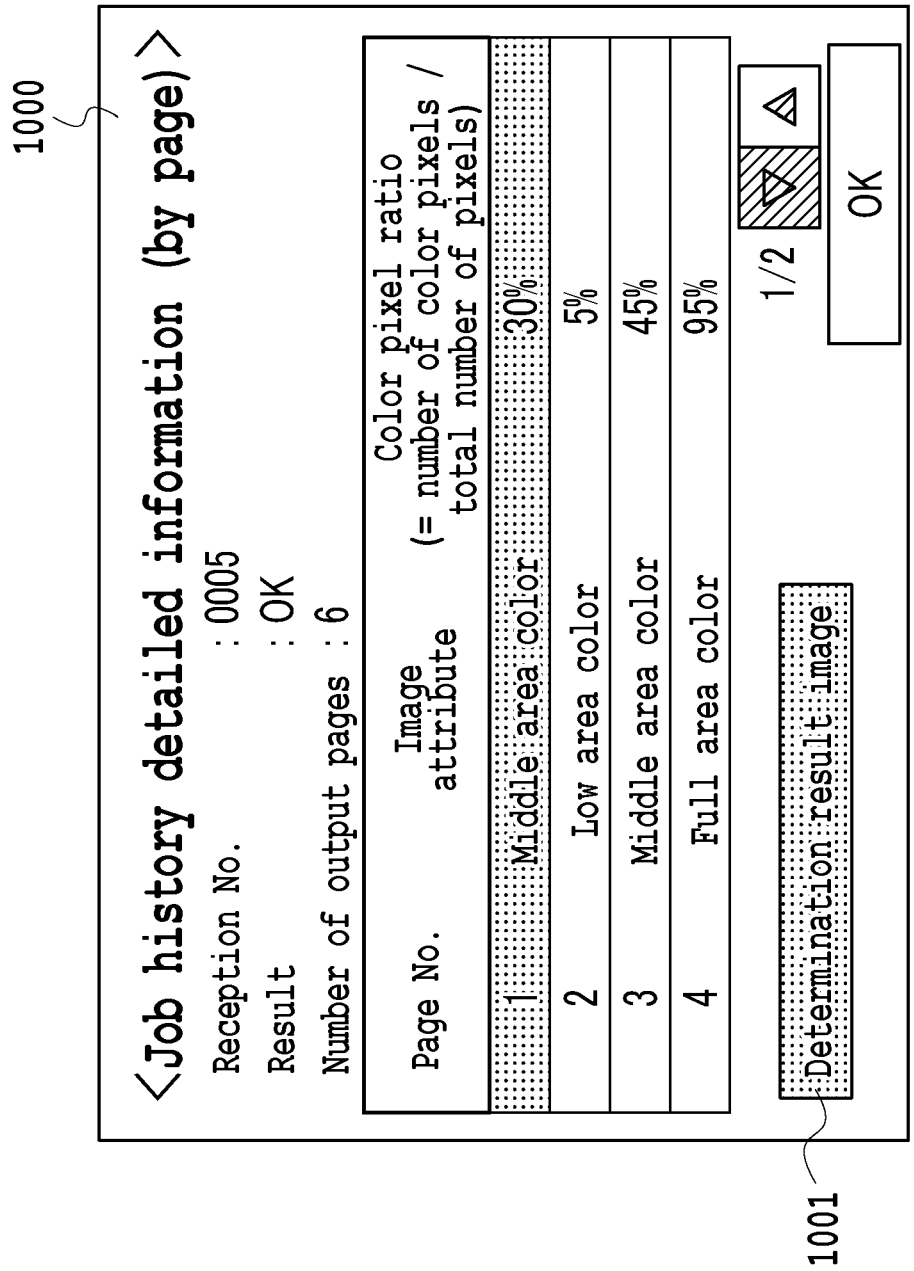
FIG. 10 is a diagram showing an example of a Job history detailed information (by page) screen.
Figure 11:
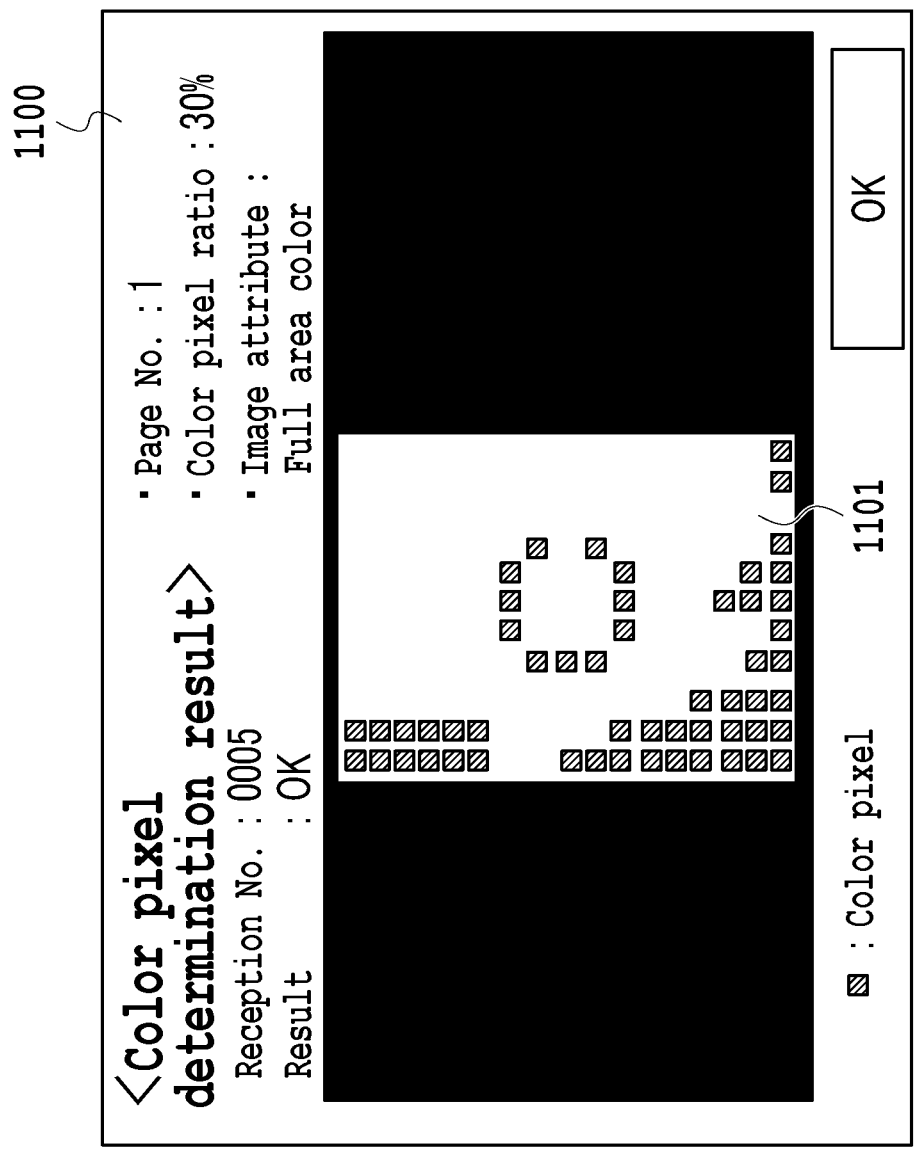
FIG. 11 is a diagram showing an example of a Color pixel determination result screen.

FIG. 7 is a diagram showing an example of a Main menu screen displayed at the time of activation of the image forming apparatus. On a Main menu screen 700, buttons for each function, i.e. "Copy", "Scan and transmit", "Scan and save", and "Use saved file" are provided. As a button to check information during the job execution and information after the job is completed, there is provided a State check button 701. A user presses the State check button 701 to check job history information. In response to pressing of the State check button 701, the screen changes to a State check screen. FIG. 8 is a diagram showing an example of the State check screen. On a State check screen 800, buttons for each function, i.e. "Copy/print", "Transmit", "Save", and "Check consumables" are provided. In the case where a user intends to check job history information after copying is completed, the user selects a Job history button 802 in the state where a "Copy/print" button 801 is selected and selects "Copy" in a pull-down display area 803 where either of "Copy" and "Print" can be selected. Then, items, such as "Time" at the time of execution of copying, "User name", "Number of sheets·number of copies", and "Result" indicating whether or not printing is completed normally are displayed in a list for each job. As the features of the present embodiment, mention is made of that a "By-image-attribute sheet number" 804 is provided in the items displayed in a list. In the item of "By-image-attribute sheet number", the number of sheets of Low area color, the number of sheets of Middle area color, and the number of sheets of Full area color are displayed in a simple manner. In the case where the number of jobs displayed in a list of the job history is not accommodated in one screen, the page is divided and the total number of pages and the page number currently being checked are displayed and it is made possible to move between pages (805). By pressing an OK button 806, the State check screen 800 is closed and the screen returns to the Main menu screen 700. By pressing a Detailed information button 807, the screen changes to a screen to check detailed information of the job currently being selected (Job history detailed information screen). FIG. 9 is a diagram showing an example of the Job history detailed information screen. In the present embodiment, color pixel determination by a printer device is performed, and therefore, in an item of "Number of output pages" 901, "By-image-attribute sheet number" is displayed. Further, in the present embodiment, a Detailed information (by page) button 902 to check more detailed information for each page is provided within the item of "Number of output pages". By pressing the Detailed information (by page) button 902, the screen changes to a "Job history detailed information (by page) screen". FIG. 10 is a diagram showing an example of the Job history detailed information (by page) screen. On a Job history detailed information (by page) screen 1000, the image attribute and the color pixel ratio for each page of output printed matter are displayed in a list. By selecting an arbitrary item from the displayed list and pressing a Determination result image button 1001, the screen changes to a screen to check the result of the color pixel determination processing of the page (Color pixel determination result screen). FIG. 11 is a diagram showing an example of the Color pixel determination result screen. On a Color pixel determination result screen 1100, together with the information of the image attribute and the color pixel ratio, which is the result of the color pixel determination processing of the page, an image 1101 indicating an area determined to include color pixels in the page is displayed. In this manner, an area determined to include color pixels is displayed separately from an area determined to include no color pixels.

Figure 12:
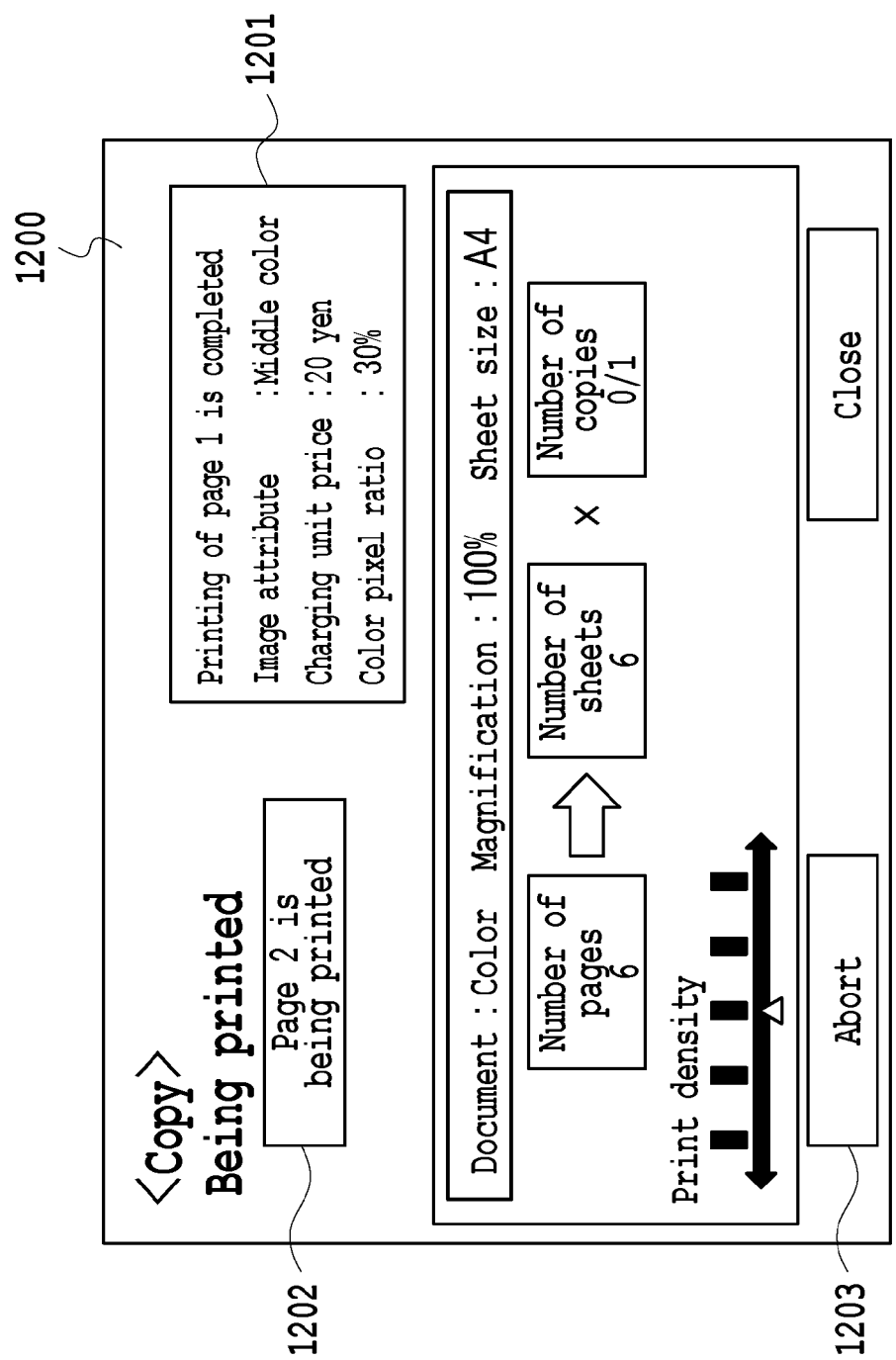
FIG. 12 is a diagram showing an example of a screen indicating that printing is being performed (Printing-time screen)

FIG. 12 is a diagram showing an example of a screen indicating that printing is being performed (Printing-time screen) displayed in the operation unit 104 at step 607. On a Printing-time screen 1200, information of, such as the kind of Document, Magnification, Sheet size, Number of pages of Document, Number of sheets output, Number of copies, and Print density, which are conventional contents of the display, is displayed. Further, on the Printing-time screen 1200, information 1201 of Image attribute, Color pixel ratio, and Charging unit price of a page already printed, and information 1202 of the number of a page currently being printed are also displayed. An Abort button 1203 is a button to abort a job currently being executed.

FIG. 13 is a diagram showing an example of a screen indicating that printing is completed (Printing completion screen) displayed in the operation unit 104 at step 609. On a Printing completion screen 1300, information of Number of output pages, By-image-attribute sheet number, and Total amount of money is displayed. By pressing a Detailed information button 1301 within the Printing completion screen 1200, the screen changes to the Job history detailed information screen 900 (FIG. 9) described previously and it is possible for a user to check details of the output printed matter.

In the present embodiment, the case is explained as an example, where printing processing is performed in accordance with a copy job, however, it is needless to say that the present embodiment can be applied to the case of printing processing in accordance with a PDL print job. In such a case, processing necessary to execute a PDL print job, such as rendering of PDL data, is performed in place of the scan of a document (step 601).

Further, at step 610, it may also be possible to save, for example, images indicative of the result of color pixel determination processing (images whose color areas are visualized in units of pages: see FIG. 11, to be described later) for all the pages in place of the above-mentioned three pieces of information. In such a case, for example, on the Job history detailed information screen, necessary alteration is made, such as that thumbnail images of images indicative of the result of color pixel determination processing for all the pages are displayed etc.

According to the present embodiment, information of the image attribute and the color pixel ratio of each output page is displayed at the time of printing and it is possible to know with which image attribute and at which charging unit price each page of the output printed matter is printed. Further, by storing the information of the image attribute and the color pixel ratio of each output page as a history, it is possible for a user to check these pieces of information later.

<Second Embodiment>

In the first embodiment, the case is explained where printing processing is performed using image data obtained by the scanner unit or PDL data input via a LAN as it is. In a second embodiment, a case is explained where image data obtained by the scanner unit is saved in a server and printing processing is performed by acquiring the image data from the server.

(Saving of Image Data Obtained by Scan)

A user selects "Scan and save" on the Main menu screen 700 described previously and after performing various kinds of settings of, such as a saving destination (here, the server 140), a saved file format, and a resolution at the time of a scan on a setting screen, not shown schematically, the user gives instructions to perform a scan. Upon receipt of the instructions to perform a scan, the image forming apparatus acquires image data by reading a document by the scanner unit 102 and sends the acquired image data to the server 140, which is an external device. Then, the server 140 saves the received image data within a predetermined storage area and also saves detailed information of the received image data in a "Saved data management table". Information saved here in the "Saved data management table" includes information of Printing-time image attribute besides File format, File name, Date of saving, etc., of the saved image data. Printing-time image attribute includes information of, such as Time of printing, Settings of printing (2in1, 4in1, one-side, both-side, etc.), and By-image-attribute sheet number at the time of performing printing processing on the saved image data, and the contents are updated each time printing processing is performed. Printing-time image attribute of image data for which printing processing is not performed yet but is just saved within the server 140 is saved as "Printing not performed yet".

(Printing of Saved Image Data)

At the time of printing image data saved in the server 140, which is an external device, or at the time of checking detailed information of image data within the server 140, a user presses the "Use saved file" button on the Main menu screen 700 described previously. Due to this, the screen changes to a Saved file screen.

Figure 14:
FIG. 14 is a diagram showing an example of a Saved file screen.
Figure 14:

FIG. 14 is a diagram showing an example of the Saved file screen. On a Saved file screen 1400, saved image data (saved file) is displayed in a list. Selecting arbitrary image data from the displayed list and pressing a Print button 1401 cause printing processing to be performed. Pressing a Detailed information button 1402 causes the screen to change to a screen on which to check detailed information of the image data being selected (Saved file detailed information screen).

Figure 15:
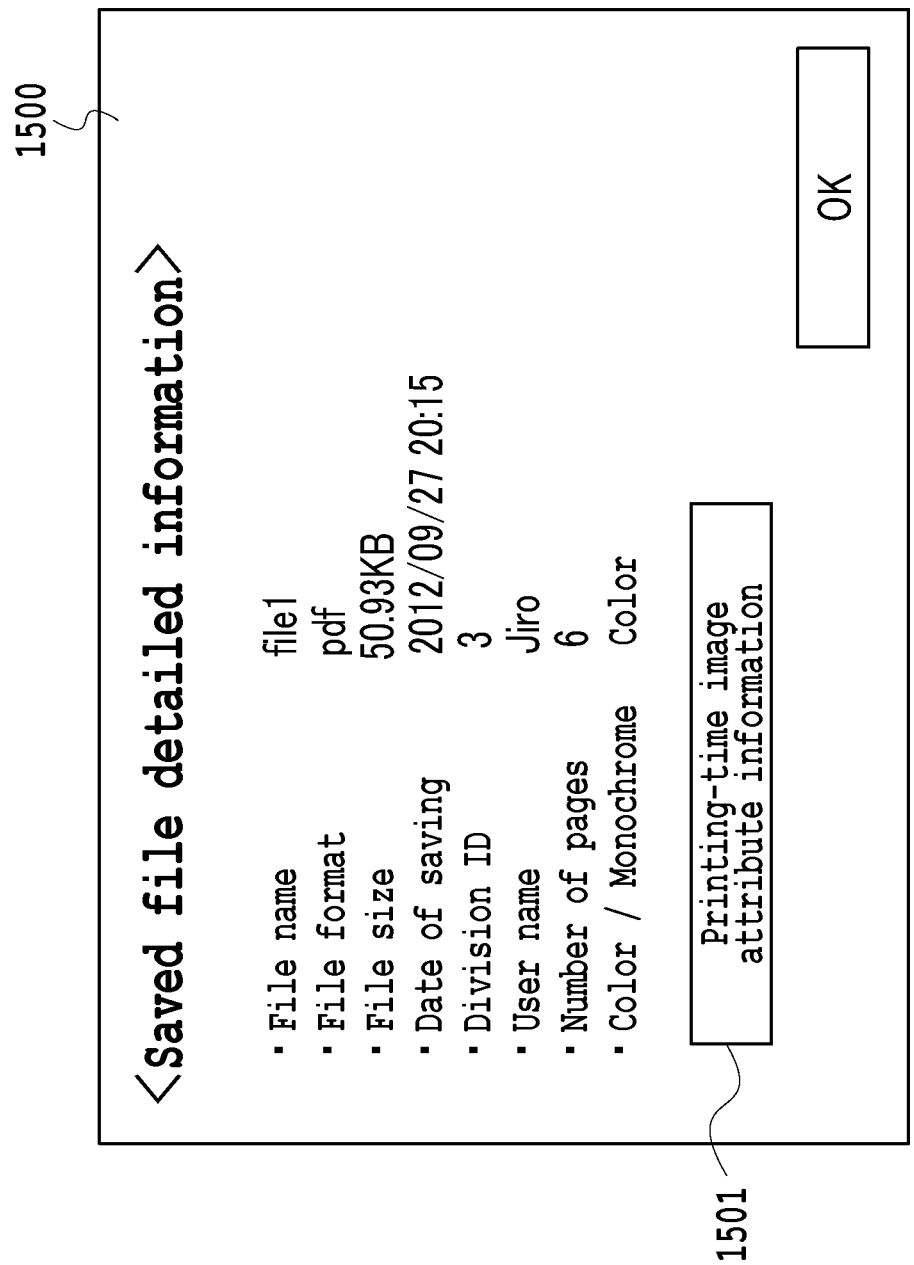
FIG. 15 is a diagram showing an example of a Saved file detailed information screen.

FIG. 15 is a diagram showing an example of the Saved file detailed information screen. An item of "Color/Monochrome" on a Saved file detailed information screen 1500 indicates the result of color/monochrome determination performed by the scanner unit 102 at the time of scan processing of the saved image data. It is also possible for a user to specify color or monochrome in which to save image data and in this case, the contents will be those specified by the user. At the time of printing image data saved within the server 140, the image data for which "Monochrome" is selected in the item of "Color/Monochrome" is printed and output with the image attribute of Low area color. The image data for which "Color" is specified in the item of "Color/Monochrome" is printed in accordance with the image attribute determined by the color pixel determination described previously.

Figure 17:
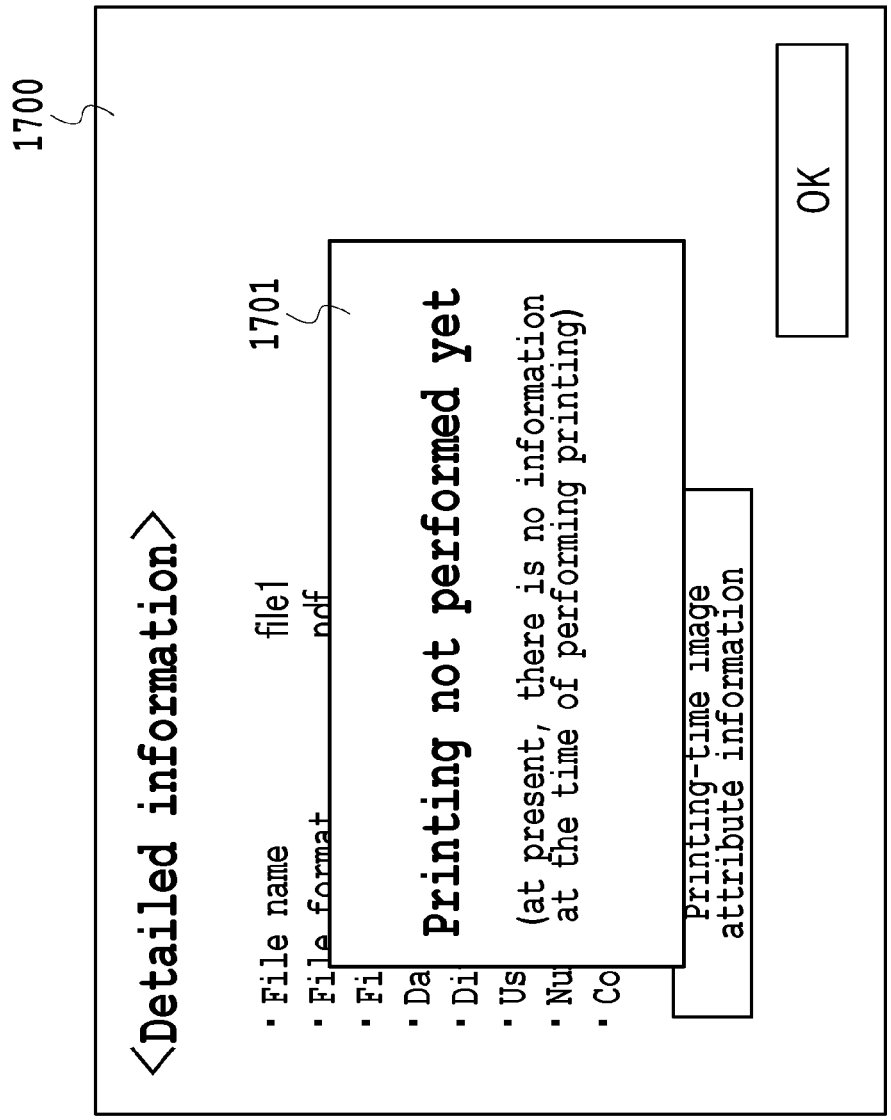
FIG. 17 is a diagram showing an example of a message indicating that printing processing is not performed yet.

By pressing a Printing-time image attribute information button 1501 within the Saved file detailed information screen 1500, a screen on which to check information of the image attribute etc. at the time of printing of the saved file (Printing-time image attribute information screen) is displayed. FIG. 16 is a diagram showing an example of the Printing-time image attribute information screen. On a Printing-time image attribute information screen 1600, information of, such as Time of printing, Settings of printing (2in1, 4in1, one-side, both-side, etc.), and By-image-attribute sheet number, at the time of printing of the saved image data is displayed in a list. Further, information of, such as the color pixel ratio for each page, the image attribute, and the charging amount for all the pages, may be included. In the case of the image data for which printing processing is not performed yet even once, in place of the Printing-time image attribute information screen 1600, a message indicating that printing processing is not performed yet is displayed. FIG. 17 is an example of the message indicating that printing processing is not performed yet and in this example, a message that "Printing not performed yet (at present, there is no information at the time of performing printing)" is displayed. By pressing a Detailed information button 1601 within the Printing-time image attribute information screen 1600, the Job history detailed information screen 900 (FIG. 9) described previously is displayed and it is possible for a user to check the detailed information of history of the job being selected.

Figure 18:
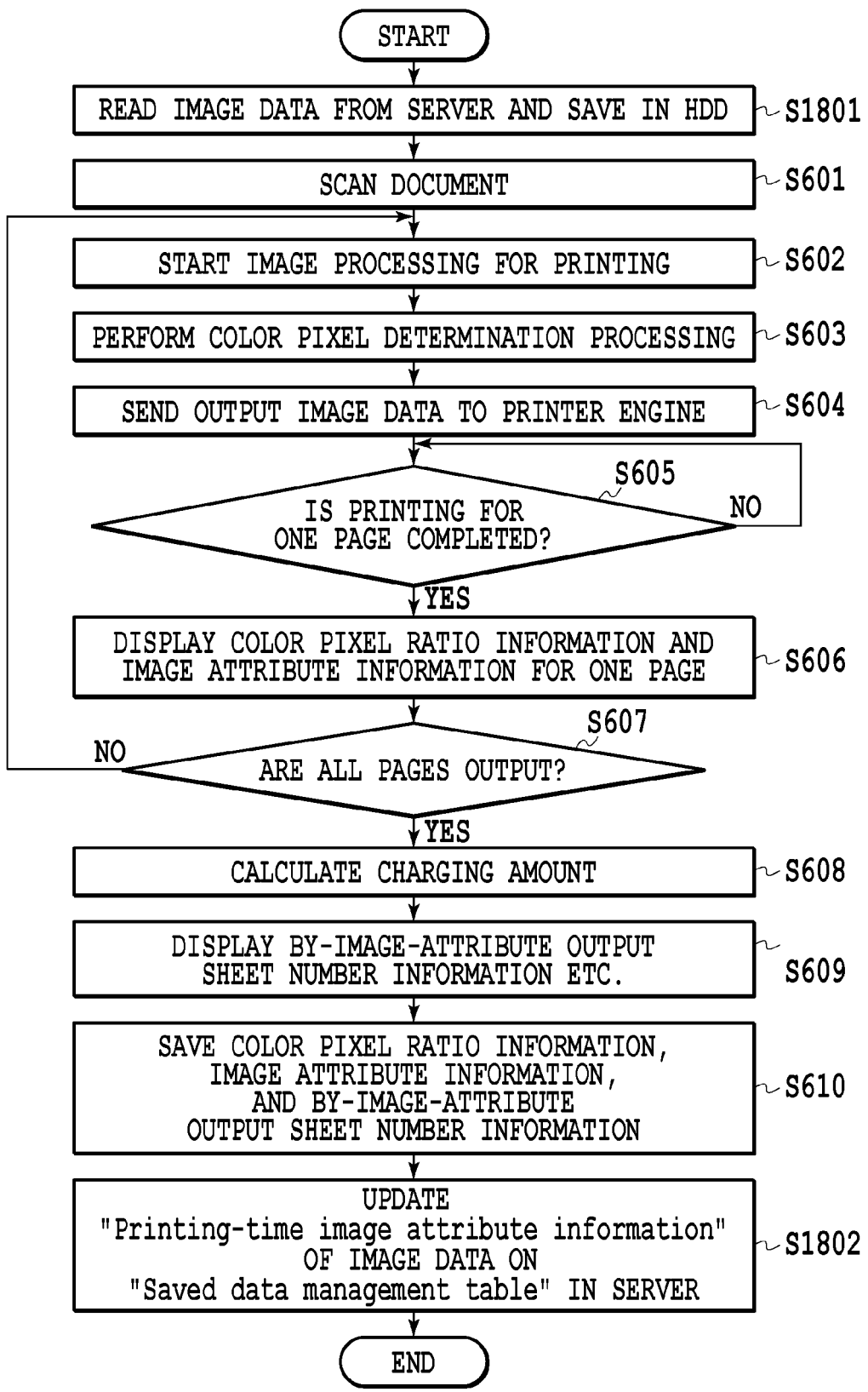
FIG. 18 is a flowchart showing a flow of processing in the case where printing is performed by acquiring image data from a server.

Subsequently, a flow of processing in the image forming apparatus in the case where saved image data is acquired from the server and printed is explained with reference to a flowchart in FIG. 18. The flowchart in FIG. 18 is almost the same as the flowchart in FIG. 6 in the first embodiment, and therefore, different points are explained mainly below.

In response to instructions to print specific image data (saved file) within the server 140 by a user via the operation unit 104, the CPU 201 accesses the server 140 to acquire image data specified by the user and stores the data in the HDD 204 at step 1801. Then, printing processing using the image data stored in the HDD 204 is performed and after printing processing of the last page is completed, information etc. of, such as the color pixel ratio in relation to the print job, is saved in the Job history information management table (step 601 to step 610). Step 601 to step 610 are already explained in the first embodiment, and therefore, explanation thereof is omitted here.

At step 1802, the CPU 201 accesses the server 140 via the network I/F 206 and gives instructions to update "Printing-time image attribute information" of the image data within the "Saved data management table". After "Printing-time image attribute information" is updated in the server 140, the update is reflected in the display of the Printing-time image attribute information screen 1600 described previously.

According to the present embodiment, it is possible for a user to predict which printing settings will result in printing to be performed with which image attribute and at which charging unit price at the time of performing printing using image data saved in the server etc.

(Other Embodiments)

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-033333, filed Feb. 22, 2013, which is hereby incorporated by reference herein in its entirety.

What is claimed is:

1. An image processing apparatus comprising:
a determination unit configured to determine an image attribute of image data in accordance with a color pixel ratio in the image data; and
a display control unit configured to control a display unit to display the determined image attribute and the color pixel ratio.

2. The image processing apparatus according to claim 1, wherein
the determination unit performs color pixel determination processing to determine whether each pixel included in the image data is a color pixel and to determine the image attribute by calculating the color pixel ratio based on the determination processing result.

3. The image processing apparatus according to claim 1, wherein
the determination unit determines the image attribute in units of pages of the image data, and
the display control unit controls the display unit to display the determined image attribute in units of pages.

4. The image processing apparatus according to claim 3, further comprising a unit configured to calculate a number of output sheets for each image attribute based on the determined image attributes for all the pages, wherein
the display control unit controls the display unit to display the calculated number of output sheets for each image attribute.

5. The image processing apparatus according to claim 1, further comprising a unit configured to calculate a charging amount based on the determined image attribute.

6. The image processing apparatus according to claim 1, wherein
the image data is image data including color components corresponding to a plurality of color materials used for forming an image.

7. The image processing apparatus according to claim 1, further comprising a storing unit configured to store information displayed by the display control unit.

8. The image processing apparatus according to claim 2, wherein
the display control unit controls the display unit to display an area determined to include color pixels by the color pixel determination processing separately from an area determined to include no color pixels.

9. An image processing method comprising the steps of:
determining an image attribute of image data in accordance with a color pixel ratio in the image data; and
controlling a display unit to display the determined image attribute and the color pixel ratio.

10. A non-transitory computer readable storage medium storing a program for causing a computer to perform the image processing method according to claim 9.

11. An image processing apparatus comprising:
a determination unit configured to determine a ratio of color pixels in image data; and
a control unit configured to control displaying of the determined ratio of color pixels on a display unit.

12. The image processing apparatus according to claim 11, wherein
the ratio refers to the ratio of the number of color pixels in the image data to the total number of pixels in the image data.

13. The image processing apparatus according to claim 11, wherein
the color pixel ratio refers to the ratio of the number of color pixels in the image data to the total number of pixels in the image data.

* * * * *